United States Patent
Yanagisawa

(10) Patent No.: US 8,364,333 B2
(45) Date of Patent: Jan. 29, 2013

(54) HYBRID-TYPE WORKING MACHINE

(75) Inventor: Makoto Yanagisawa, Yokosuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 210 days.

(21) Appl. No.: 12/758,205

(22) Filed: Apr. 12, 2010

(65) Prior Publication Data
US 2010/0268407 A1    Oct. 21, 2010

(30) Foreign Application Priority Data
Apr. 20, 2009   (JP) .................... 2009-102322

(51) Int. Cl.
*B60L 9/00* (2006.01)
(52) U.S. Cl. .......................................... 701/22
(58) Field of Classification Search .............. 701/22
See application file for complete search history.

(56) References Cited

U.S. PATENT DOCUMENTS
6,427,107 B1 *  7/2002  Chiu et al. .............. 701/50

FOREIGN PATENT DOCUMENTS
| EP | 1 455 439 | * | 9/2004 |
| EP | 1 845 055 | * | 8/2006 |
| EP | 1 845 055 | | 10/2007 |
| JP | 05-077680 | | 3/1993 |
| JP | 2001-226077 | | 8/2001 |
| JP | 2002-322681 | | 11/2002 |
| JP | 2006 205777 | | 8/2006 |
| JP | 2007 191973 | | 8/2007 |
| JP | 2007-290607 | | 11/2007 |
| JP | 2009 261096 | | 11/2009 |

OTHER PUBLICATIONS

Extended european search report dated Aug. 5, 2010.

* cited by examiner

*Primary Examiner* — Thomas Tarcza
*Assistant Examiner* — Maceeh Anwari
(74) *Attorney, Agent, or Firm* — IPUSA, PLLC

(57) ABSTRACT

A hybrid-type working machine includes a plurality of electric loads and an electric storage part supplying an electric power to a motor generator and the electric loads. A priority setting part sets a priority to each electric load. A supply power computing part computes an available electric power, which can be supplied from the motor generator and the electric storage part to the electric loads. A total power computing part computes a total electric power amount by summing electric power amounts requested by the electric loads. A power distributing part compares the available electric power with the total electric power amount, and, when the available electric power is larger than the total electric power amount, determines a distribution ratio of electric power amounts to be supplied to the respective electric loads based on the priority to limit the electric power amounts supplied to the electric loads.

5 Claims, 8 Drawing Sheets

HYBRID-TYPE WORKING MACHINE

BACKGROUND OF THE INVENTION

1. Field of the Invention

The present invention relates to hybrid-type working machines and, more particularly, to a hybrid-type working machine having a plurality of electric loads.

2. Description of the Related Art

Generally, a hybrid-type working machine performs work by hydraulic pressure generated by a hydraulic pump, which is driven by an output of an engine (internal-combustion engine). The engine is efficiently operated by being assisted by an operation of a motor generator as an electric motor. The motor generator is mainly driven by electric power output from a battery. The battery, which is of a charge-discharge type, discharges electric power when assisting the engine. On the other hand, when the motor generator does not assist the engine, the motor generator serves as an electric generator by being driven by a power output from the engine. The electric power output from the motor generator, which is operated as an electric generator, is charged to the battery. Thereby, the battery is always maintained in a charged state in a certain extent so that the engine can be assisted by the motor generator driven by an electric power discharged from the battery.

Because the hybrid-type working machine is capable of assisting the engine by the motor generator, a maximum output of the engine can be reduced, which allows a small-size engine to be used. Additionally, when an output larger than the maximum output of the engine is requested by the hydraulic pump, such a request is met by assistance by the motor generator.

When the engine is assisted by the motor generator so that the request of the hydraulic pump is met, it is necessary to determine a power of the motor generator to output in order to assist the motor generator.

Japanese Laid-Open Patent Application No. 2007-290607 suggests a technique to correct a distribution ratio of a power output from a motor generator. In this technique, a hydraulic pump request power is acquired to determine the distribution ratio of the output power of the motor generator in response to the acquired motor power, and a difference between a target revolution speed and an actual revolution speed of an engine is acquired to correct the power distribution ratio in a direction to eliminate the difference.

A hybrid-type working machine is provided with not only a motor generator as an electric load but also other electric loads in many cases. For example, a hybrid-type hydraulic shovel is provided with electric loads such as a turning electric motor, a traveling electric motor, a lifting magnet, etc. Those electric loads are driven by electric power mainly supplied from a battery. However, an amount of electric power supplied by the battery is limited. If each of a plurality of electric loads requests a large electric power simultaneously, there may be a case where the requested electric power cannot be supplied sufficiently to all of the electric loads.

Thus, it is necessary to determine how to supply limited electric power to a plurality of electric loads when a total amount of electric power requested by the plurality of electric loads exceeds an available electric power.

SUMMARY OF THE INVENTION

There is provided according to the present invention a hybrid-type working machine comprising: an engine that drives a hydraulic pump; a motor generator that assists the engine; a plurality of electric loads; an electric storage part that supplies electric power to the motor generator and the electric loads; and a control part that controls the engine, the motor generator, the electric loads and the electric storage part, wherein the control part includes: a priority setting part configured to set a priority to each of the electric loads; a supply power computing part configured to compute available electric power, which can be supplied from the motor generator and the electric storage part to the electric loads; a total power computing part configured to compute total electric power by summing electric power amounts requested by the electric loads; and a power distributing part configured to compare the available electric power with the total electric power, and, when the available electric power is larger than the total electric power, determine a distribution ratio of electric power amounts to be supplied to the respective electric loads based on the priority to limit the electric power amounts supplied to the electric loads.

In the above-mentioned hybrid-type working machine, the power distributing part may determine the distribution ratio so that no limitation is applied to the electric power to be supplied to one of the electric loads, which one is given the priority indicating a highest priority. when the electric power requested by the one of the electric loads given the highest priority is larger than the available electric power, the power distributing part may determine the distribution ratio so that the entire available electric power is supplied to the one of the electric loads given the highest priority. When there are a plurality of electric loads given the same priority from among the electric loads, the power distributing part may determine the distribution ratio so that the electric power to be supplied to the plurality of electric loads given the same priority is divided according to a ratio of electric power amounts requested by each of the plurality of electric loads given the same priority. When the plurality of electric loads includes a lifting magnet, the priority setting part may set a highest priority to the lifting magnet.

According to the above-mentioned invention, if a total of the electric power amounts requested by a plurality of electric loads is larger than the available electric power, which can be supplied to the electric loads, the available electric power can be distributed appropriately to each of the electric loads in consideration of a characteristic and an operating condition of each of the electric loads.

Other objects, features and advantages of the present invention will become more apparent from the following detailed description when read in conjunction with the accompanying drawings.

DETAILED DESCRIPTION OF THE PREFERRED EMBODIMENTS

A description will be given below, with reference to the drawings, of embodiments according to the present invention.

A hybrid-type working machine to which the present invention is applicable may be any hydraulic working machine as long as it performs work using hydraulic pressure generated by a hydraulic pump while assisting an engine by a motor generator driven by electric power from a battery. Such a hybrid-type working machine may be, for example, a power shovel, a lifting magnet, a crane, a wheel loader or the like.

Figure 1:
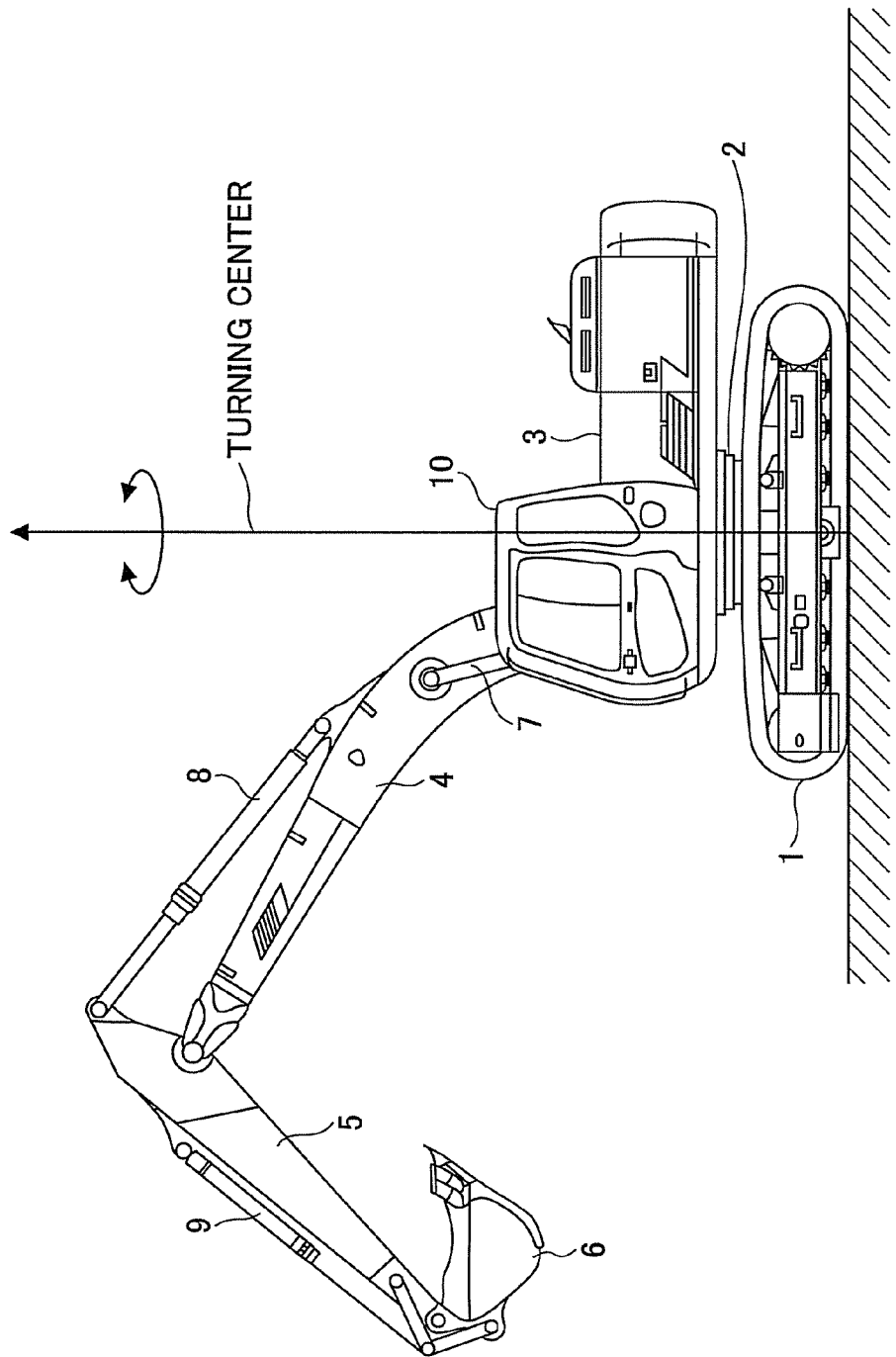
FIG. 1 is a side view of a hybrid-type shovel, which is an example of a hybrid-type working machine according to an embodiment of the present invention.

FIG. 1 is a side view of a hybrid-type shovel, which is an example of a hybrid-type working machine according to an embodiment of the present invention. An upper-part turning body 3 is mounted to a lower-part moving body 1 of the hybrid-type shovel via a turning mechanism 2. A boom 4 extends from the upper-part turning body 3, and an arm 5 is connected at an end of the boom 4. A bucket 6 is connected at an end of the arm 5. The boom 4, the arm 5 and the bucket 6 are hydraulically driven by a boom cylinder 7, an arm cylinder 8 and a bucket cylinder 9, respectively. Additionally, a cabin 10 and a power source (not illustrated in the figure) are mounted to the upper-part turning body 3.

Figure 2:
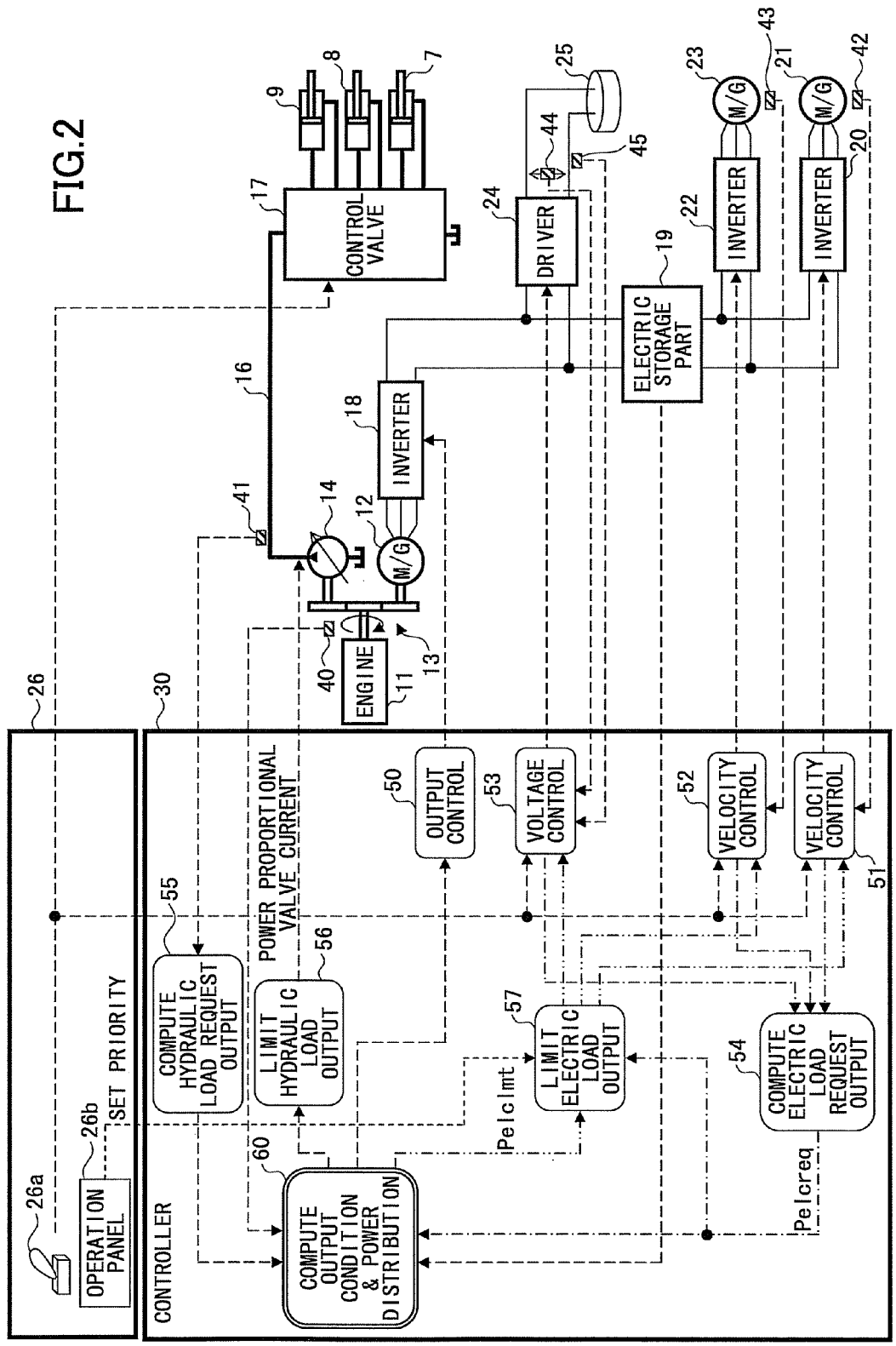
FIG. 2 is a block diagram illustrating a structure of a drive system and a control system of the hybrid-type shovel illustrated in FIG. 1.

FIG. 2 is a block diagram illustrating a structure of a drive system and a control system of the hybrid-type shovel illustrated in FIG. 1. In FIG. 2, a mechanical power system is indicated by double lines, high-pressure hydraulic lines by bold lines, an electric system by thin lines, and an electric control system by dotted lines.

Both an engine 11 as a mechanical drive part and a motor generator (M/G) 12 as an assist drive part are connected to an input shaft of a splitter 13, which serves as a power-up machine or a speed-reduction machine. A main pump 14 is connected to an output shaft of the splitter 13. A control valve 17 is connected to the main pump 14 through a high-pressure hydraulic line 16.

The control valve 17 is a control device, which controls a hydraulic system in the hybrid-type shovel. The boom cylinder 7, the arm cylinder 8 and the bucket cylinder 9 are connected to the control valve 17 through high-pressure hydraulic lines.

The motor generator 12 is connected via an inverter 18 to an electric storage part 19 containing a battery. The electric storage part 19 is connected with a turning electric motor 21 via an inverter 20. The turning electric motor 21 is an electric load in the hybrid-type shovel. Additionally, the electric storage part 19 is connected with a moving electric motor 23 via an inverter 22. The moving electric motor 23 is also an electric load in the hybrid-type shovel.

Further, the electric storage part 19 is connected with a lifting magnet 25 via a driver 24. The lifting magnet 25 is a tool attachable as an option to the hybrid-type shovel. The lifting magnet 25 is attached to an end of the arm 5 instead of the bucket 6. When the lifting magnet 25 is attached, the hybrid-type shovel does not serve as a shovel but serves as a transporting machine for carrying iron and steel materials.

Figure 3:
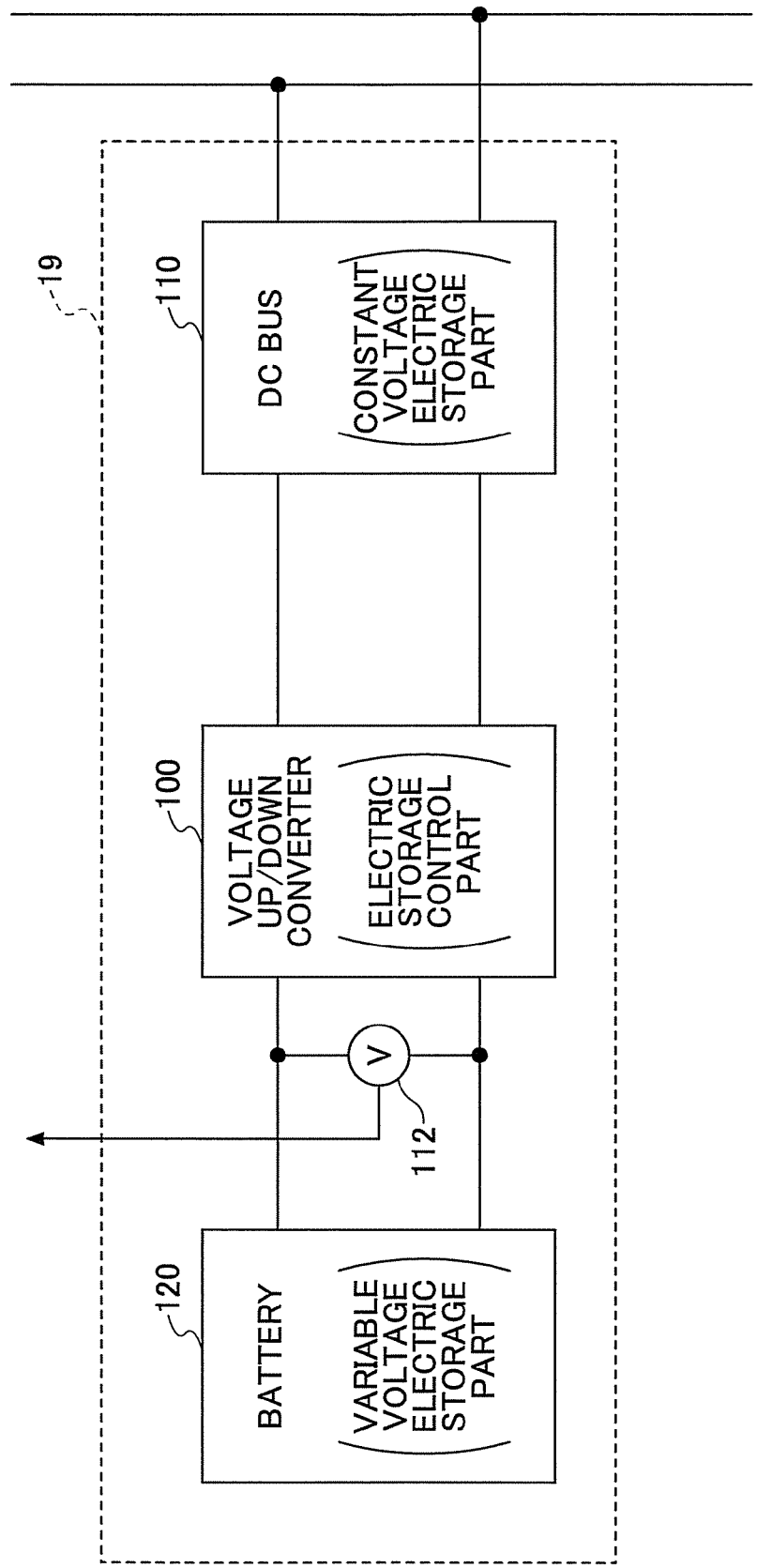
FIG. 3 is a block diagram illustrating a structure of an electric storage part.

A description will be given below of the electric storage part 19. FIG. 3 is a block diagram illustrating a structure of the electric storage part 19. The electric storage part 19 includes a DC bus 110 as a constant voltage electric storage part, a voltage up/down converter 100 as an electric storage control part, and a battery 120 as a variable voltage electric storage part.

The voltage up/down converter 100 is connected between the DC bus 110 and the battery 120 to perform a control of switching between a voltage-up and a voltage-down so that the voltage of the DC bus 110 falls within a fixed range. For example, because it is necessary to supply an electric power to the motor generator 12 through the inverter 18 when the motor generator 12 performs an electric motor operation (assisting operation), the voltage up/down converter 100 raises the voltage of the DC bus 110. On the other hand, when the motor generator 12 performs an electric power generating operation, the voltage up/down converter 100 lowers the voltage of the DC bus 110 in order to supply and charge the generated electric power to the battery 120 through the inverter 18. The above-mentioned operations are the same in a power-running operation and a regenerative operation of the turning electric motor 21 and the moving electric motor 23.

An operation state of the motor generator 12 is changed in response to a loading state of the engine 11. An operation state of the turning electric motor 21 is changed in response to a turning operation of the upper-part turning body 3. An operation state of the moving electric motor 23 is changed in response to a moving operation. Thus, there may be a condition in which any one of the motor generator 12, the turning electric motor 21 and the moving electric motor 23 performs electric motor operation (assisting operation) or a power-running operation and, simultaneously, any one of them performs an electric power generating operation or a regenerative operation. For this reason, the voltage up/down converter 100 performs the control of switching between a voltage-up operation and a voltage-down operation in response to the operation states of the motor generator 12, the turning electric motor 21 and the moving electric motor 23 so that the voltage of the DC bus 110 falls within a fixed range.

The DC bus 110 is provided between the voltage up/down converter 110 and each of the inverters 18, 20 and 22. The DC bus 110 is configured so that a large amount of electric power (a large electric current) can be exchanged between the battery 120 and each of the motor generator 12, the turning electric motor 21 and the moving electric motor 23. In the present embodiment, the driver 24, which drives the lifting magnet 25, is also connected to the DC bus 110 so that electric power can be supplied from the DC bus 110 to the lifting magnet 25 through the driver 24.

Although the battery 120 can be any rechargeable electric storage part or cell, a capacitor (electric double layer capacitor) is used as the battery 120 in the present embodiment. A voltage sensor 112 is provided between the battery 120 and the voltage up/down converter 100 to detect a voltage of the battery 120. A voltage of the battery 120 detected by the voltage sensor 112 is supplied to the controller 30.

Returning to FIG. 2, the cabin 10 of the hybrid-type shovel is provided with an operation apparatus 26. The operation apparatus 26 includes a group of operation levers 26a and an operation panel 26b. The operation levers 26a is operated by an operator of the hybrid-type shovel to perform work by the hybrid-type shovel. The operation panel 26b displays various sets of information such as a set of information regarding an operation state of the hybrid-type shovel. Also, the operator can input operation commands and input information through the operation panel 26b. Operation commands created by operating the operation levers 26a are supplied to the control valve 17, which controls hydraulic pressure supplied to the boom cylinder 7, the arm cylinder 8 and the bucket cylinder 9 to drive the boom cylinder 7, the arm cylinder 8 and the bucket cylinder 9 based on the operation commands supplied from the operation apparatus 26.

The operation commands created by an operation of the operation levers 26a and the input information input through the operation panel 26b are supplied also to the controller 30, which is a control part to control an operation of the hybrid-type shovel. The controller 30 includes a microcomputer having a processor and a memory. A structure and a function of the controller 30 will be described later.

Information indicating a state of each drive part is supplied to the controller as a control part. A revolution speed of the engine 11 is detected by a speed sensor 40 provided to the output shaft of the engine 11, and the detected revolution speed value is supplied to the controller 30. A pressure and an amount of flow of an operating oil are detected by a pressure/flow sensor 41 provided to the high-pressure hydraulic line 16, and the detected pressure value and flow amount value are supplied to the controller 30.

A rotation speed of the turning electric motor 21 is detected by a speed sensor 42 provided to the turning electric motor 21, and the detected speed value is supplied to the controller 30. A rotation speed of the moving electric motor 23 is detected by a speed sensor 43 provided to the moving electric motor 23, and the detected speed value is supplied to the controller 30. A voltage and a current supplied to the lifting magnet 25 are detected by a voltage sensor 44 and a current sensor 45, and the detected voltage value and current value are supplied to the controller 30.

In the hybrid-type shovel having the above-mentioned structure, a drive control of each part is performed by the controller 30. As mentioned above, the hybrid-type shovel has a plurality of electric loads such as the turning electric motor 21, the moving electric motor 23 and the lifting magnet 25 that are driven by electric power supplied from the electric storage part 19.

Each of the electric loads can be individually driven by an operation of the respective operation levers 26a. For example, the operator can operate the operation levers 26 to move the hybrid-type shovel while lifting a material by the lifting magnet 25 and also turning the upper-part turning body 3. In such a case, all of the lifting magnet 25, the moving electric motor 23 and the turning electric motor 21 request electric power to be supplied thereto in order to be actuated. If a total amount of the electric power requested by the lifting magnet 25, the moving electric motor 23 and the turning electric motor 21 is equal to or smaller than electric power available from the motor generator 12 and the electric storage part 19, the requested electric power amounts can be supplied to all of the lifting magnet 25, the moving electric motor 23 and the turning electric motor 21 to drive them. However, there may be a case where the total of the electric power amounts requested by the lifting magnet 25, the moving electric motor 23 and the turning electric motor 21 is larger than the electric power available from the motor generator 12 and the electric storage part 19. In such a case, it is necessary to appropriately distribute the electric power available from the motor generator 12 and the electric storage part 19 to the lifting magnet 25, the moving electric motor 23 and the turning electric motor 21.

Thus, in the present embodiment, the controller 30 controls electric power amounts actually supplied to each of the plurality of electric loads so that the electric power available from the motor generator 12 and the electric storage part 19 is appropriately distributed to the electric loads including the lifting magnet 25, the moving electric motor 23 and the turning electric motor 21. A description will be given below of a function of the controller 30 to control electric power amounts actually supplied to each electric load. It should be noted that the control functions of the controller 30 are illustrated inside the controller 30 illustrated in FIG. 2.

First, a description will be given, with reference to FIG. 2, of a control function of the electric load system, which the controller 30 performs. Referring to the functions indicated in the controller 30 illustrated in FIG. 2, the controller 30 has an output control function 50 to control an output of the motor generator 12. The output control function 50 controls an operation of the motor generator 12 by controlling the inverter 18 in order to cause the motor generator 12 to serve as an electric motor to assist the engine 11 or to serve as an electric generator to generate electric power.

Moreover, the controller 30 has a speed control function 51 to control an operation of the turning electric motor 21. The speed control function 51 controls a rotation speed of the turning electric motor 21 by controlling the inverter 20 based on a speed detection value output from the speed sensor 42. Furthermore, the controller 30 has a speed control function 52 to control an operation of the moving electric motor 23. The speed control function 52 controls a rotation speed of the moving electric motor 23 by controlling the inverter 22 based on a speed detection value output from the speed sensor 43. Furthermore, the controller 30 has a voltage control function 53 to control an operation of the lifting magnet 25. The voltage control function 53 controls a voltage applied to the lifting magnet 25 by controlling the driver 24 based on a voltage detection value output from the voltage sensor 44 and a current detection value output from the current sensor 45.

As mentioned above, the controller 30 has the function to control the operation of each of the electric loads.

Moreover, the controller 30 has an electric load request output computing function 54. The electric load request output computing function 54 computes a total amount of request electric power Pelcreq by summing a request electric power amount acquired from the speed control function 52 of the moving electric motor 23 and a request electric power amount acquired from the voltage control function 53 of the lifting magnet 25. The electric load request output computing function 54 notifies an output condition computing and power distributing function 60 of the computed total amount of request electric power Pelcreq.

On the other hand, the controller 30 has a hydraulic load request output computing function 55. The hydraulic load request output computing function 55 computes a power requested by a hydraulic load based on a pressure value and a flow amount value supplied from the pressure/flow sensor 41. Then, the hydraulic load request output computing function 55 notifies the output condition computing and power distributing function 60 of the computed hydraulic load request output.

The output condition computing and power distributing function 60 determines a maximum output (a value which can be output) of the engine 11 based on the speed detection value measured and output by the speed sensor 40 of the engine 11. Additionally, the output condition computing and power distributing function 60 determines a maximum discharge electric power and a maximum charge electric power of the battery based on the voltage detection value measured and output by the voltage sensor 112 of the electric storage part 19. Then, the output condition computing and power distributing function 60 determines an output command of the motor generator, a hydraulic load output limiting value and an electric load output limiting value based on the thus-determined engine maximum output, battery maximum discharge electric power, battery maximum charge electric power, hydraulic load request output and electric load request output. Thereby, the electric power which the motor generator 12 can supply is determined. The hydraulic load output limiting function 56 computes an output of the hydraulic pump 14 and controls a power proportional valve current of the hydraulic pump 14 so that the output of the hydraulic pump 14 becomes equal to the hydraulic load output limiting value. The output control function 50 of the motor generator 12 controls the inverter 18 based on the output command of the motor generator 12 computed by the output condition computing and power distributing function 60.

Then, the output condition computing and power distributing function 60 notifies the electric load output limiting function 57 of the computed electric load output limiting value Pelclmt. If the total request power output value Pelcreq is smaller than the notified electric load output value Pelclmt, the electric load output limiting function 57 creates an output limiting value for limiting electric power to be supplied to each of the electric loads (namely, the turning electric motor 21, the moving electric motor 23 and the lifting magnet 25). The electric load output limiting function 57 notifies the speed control function 51 of the turning electric motor 21, the speed control function 52 of the moving electric motor 23 and the voltage control function 53 of the lifting magnet 25 of the created output limiting value. Then, the speed control function 51 of the turning electric motor 21, the speed control function 52 of the moving electric motor 23 and the voltage control function 53 of the lifting magnet 25 controls the inverter of the turning electric motor 21, the inverter 22 of the moving electric motor 23 and the driver 24 of the lifting magnet 25 so that the notified output limiting value is satisfied.

It should be noted that, when the electric load output limiting value Pelclmt is larger than the total request power output value Pelcreq, there is no need to limit the output of each of the electric loads. Accordingly, the speed control function 52 of the moving electric motor 23 and the voltage control function 53 of the lifting magnet 25 control the inverter 20 of the turning electric motor 21, the inverter 22 of the moving electric motor 23 and the driver 24 of the lifting magnet 25 so that the electric power requested by the turning electric motor 21, the moving electric motor 23 and the lifting magnet 25 is supplied.

A description will be given below of a creation of a limit command performed by the above-mentioned electric load output limiting function 57. When the limit electric power value Pelclmt is measured and output by the output condition computing and power distributing function 60, the electric load output limiting function 57 first distributes the limit electric power value Pelclmt to each electric load. This distribution is performed base on a priority given to each electric load. The priority of each electric load is previously determined and stored as information in the controller 30. The priority can be input and changed by an operator through the operation panel 26*b*.

In the present embodiment, "priority 1" is set to the lifting magnet 25, and "priority 2" is set to the turning electric motor 21 and the moving electric motor 23. A smaller number of the priority indicates a higher-priority priority for electric supply. In the present embodiment, the electric power supplied to the electric load given the "priority 1" is not limited so that the request electric power amount is supplied thereto without limitation. On the other hand, an electric power determined by subtracting the electric power supplied to the electric load given the "priority 1" from the available electric power is supplied to the electric load given the "priority 2". If there are a plurality of electric loads given the same priority, the electric power to be supplied thereto is distributed in proportion to a ratio of the electric power requested by the electric loads given the same priority.

Figure 4:
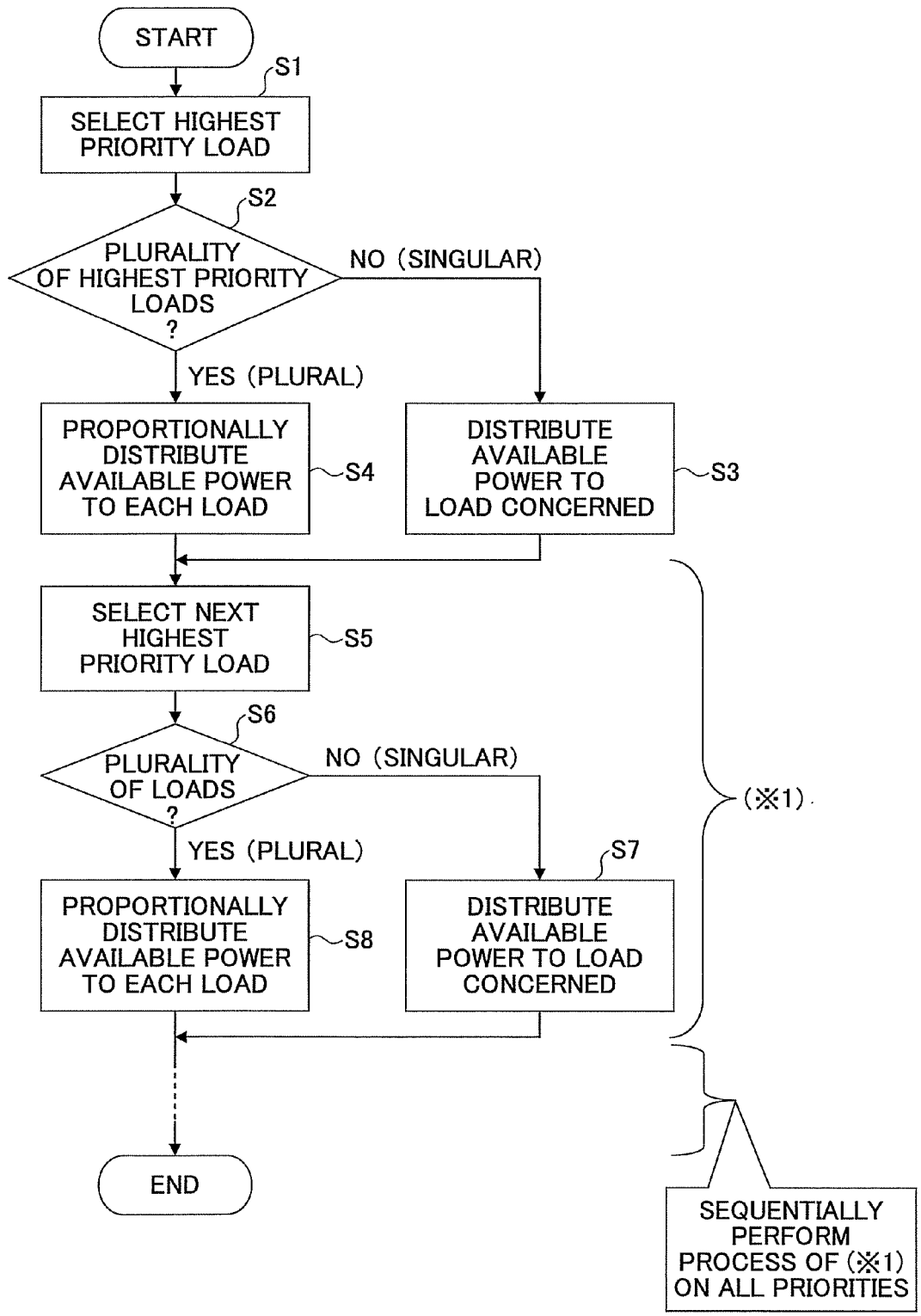
FIG. 4 is a flowchart of an electric power distributing process performed by an electric load output limiting function.

FIG. 4 is a flowchart of an electric power distributing process performed by the electric load output limiting function 57. When the limit electric power value Pelclmt is supplied from the output condition computing and power distributing function 60, the electric load output limiting function 57 selects, in step S1, one of the electric loads having a highest priority. In the present embodiment, the "priority 1", which is the highest priority, is set to the lifting magnet 25. Thus, the lifting magnet 25 is selected in step S1. The lifting magnet 25 is constituted by an electromagnet to generate a magnetic force to attract and hold iron and steel materials. Accordingly, if an electric power (electric current) supplied to the lifting magnet 25 is limited, the magnetic force generated by the lifting magnet 25 is reduced, which deteriorates a workability. Thus, the electric power supplied to the lifting magnet 25 should not be limited, and the "priority 1" is set to the lifting magnet 25.

If the lifting magnet 25 given the "priority 1" is selected in step S1, then, it is determined in step S2 whether a plurality of electric loads are selected. That is, it is determined whether there are a plurality of electric loads given the highest priority. If it is determined in step S2 that a plurality of electric loads are not selected, that is, only one electric load is selected, the process proceeds to step S3. In step S3, the available electric power is distributed to the selected electric load. In the present embodiment, because only one lifting magnet 25 is given the "priority 1", and only a single electric load is selected, the available electric power is solely distributed to the lifting magnet 25 in step S3. Normally, an electric power to be supplied to the lifting magnet 25 is smaller than the electric power, which the motor generator 12 and the electric storage part 19 can supply (that is, the output limit value Pelclmt). Thus, the electric power requested by the lifting magnet 25 is set to the electric power actually supplied to the lifting magnet 25.

Figure 5:
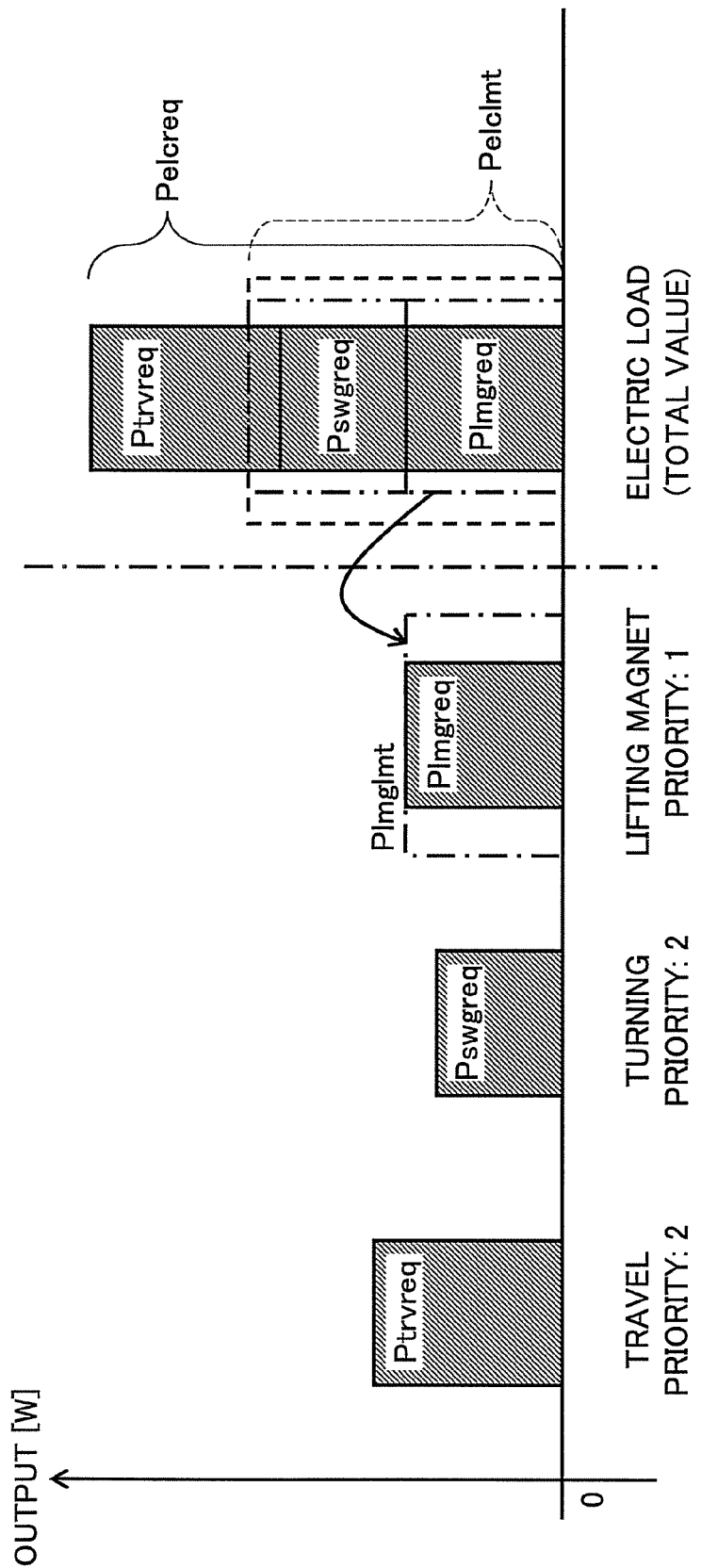
FIG. 5 is an illustration for explaining steps S1 through S3 in the flowchart of FIG. 4.

FIG. 5 is an illustration for explaining the above-mentioned steps S1 through S3. In FIG. 5, the request electric power of the moving electric motor 23 and the request electric power of the turning electric motor 21 and the request electric power of the lifting magnet 25 are indicated by bar graphs. Besides, the total request electric power Pelcreq computed by the electric load request output computing function 54 is indicated by a bar graph. The total request electric power Pelcreq is an electric power obtained by summing the request electric power amount Ptrvreq of the moving electric motor 23, the request electric power amount Pswgreq of the turning electric motor 21 and the request electric power amount Plmgreq of the lifting magnet 25. Performing the power distributing process means that the limit electric power value Pelclmt supplied by the output condition computing and power distributing function 60 is equal to or smaller than the total request electric power amount Pelcreq. In FIG. 5, the limit electric power value Pelclmt is indicated by dotted lines in the bar graph representing the total request electric power Pelcreq.

Here, the request electric power amount Plmgreq of the lifting magnet 25 given the "priority 1" selected in step S1 is smaller than the limit electric power value Pelclmt. Thus, the request Plmgreq of the lifting magnet 25 indicated by single-dashed chain lines is the electric power Plmglmt actually supplied to the lifting magnet 25 without change. As mentioned above, electric power is supplied to the electric load given the "priority 1" with no limitation.

On the other hand, if it is determined in step S2 that a plurality of electric loads are selected, the process proceeds to step S4. In step S4, the available electric power is distributed to the selected plurality of electric loads. A distribution method of the available electric power is to distribute the available electric power, when there are a plurality of electric loads given the same priority, to the electric loads in proportion to the request electric power of the plurality of electric loads. It should be noted that it is preferable to supply the electric power as requested to the electric load given the "priority 1", which is the highest priority, and the "priority 1" is set to only one electric load. For this reason, normally, the process does not proceed to step S4 but proceeds from step S3 to step S5.

In step S5, the electric load given a second highest priority, that is, the electric load to which the "priority 2" is set is selected. In the present embodiment, the moving electric motor 23 and the turning electric motor 21 are given the same "priority 2". Thus, both the moving electric motor 23 and the turning electric motor 21 are selected in step S5. Then, it is determined in step S6 whether a plurality of electric loads are selected.

If it is determined in step S6 that only one electric load is selected, the process proceeds to step S7. In step S7, an electric power amount obtained by subtracting the electric power amount to be supplied to the electric load given the "priority 1" in step S3 from the available electric power Pelclmt, is supplied to the selected electric load. The electric power amount obtained by subtracting the electric power amount to be supplied to the electric load given the "priority 1" in step S3 from the available electric power Pelclmt corresponds to a portion indicated by double-dashed chain lines in the bar graph of the total request electric power amount Pelcreq in FIG. 5. If the request electric power amount of the electric load selected in step S6 is equal to or smaller than the electric power amount obtained by subtracting the electric power amount to be supplied to the electric load given the "priority 1", the electric power as requested is supplied to the electric load selected in step S6. On the other hand, if the request electric power amount of the electric load selected in step S6 is larger than the electric power amount obtained by subtracting the electric power to be supplied to the electric load given the "priority 1", the electric power amount supplied to the electric load selected in step S6 is limited so that an electric power amount obtained by subtracting the electric power amount to be supplied to the electric load given the "priority 1" from the available electric power Pelclmt is supplied to the electric load selected in step S6.

On the other hand, if it is determined, in step S6, that a plurality of electric loads are selected, the process proceeds to step S8. In step S8, an electric power amount obtained by subtracting the electric power to be supplied to the electric load given the "priority 1" in step S3 from the available electric power Pelclmt, is supplied to the selected electric loads. If a total of the request electric power amounts of the electric loads selected in step S6 is equal to or smaller than the electric power amount obtained by subtracting the electric power amount to be supplied to the electric load given the "priority 1", the electric power as requested is supplied to each of the electric loads selected in step S6. On the other hand, if the total amounts of the request electric power of the electric loads selected in step S6 is larger than the electric power amount obtained by subtracting the electric power amount to be supplied to the electric load given the "priority 1", the electric power amount supplied to the electric loads selected in step S6 is limited so that an electric power amount obtained by subtracting the electric power amount to be supplied to the electric load given the "priority 1" from the available electric power Pelclmt, is distributed to the electric loads selected in step S6. The distributing method is the above-mentioned method of distributing in proportion to the degrees of outputs requested by the electric loads.

Because the moving electric motor 23 and turning electric motor 21 correspond to the electric loads given the "priority 2", the two electric loads, the moving electric motor 23 and the turning electric motor 21, are selected in step S5. Then, in step S6, it is determined that there are a plurality of electric loads, and the process proceeds to step S8. Then, in step S8, the remaining electric power amount obtained by subtracting the electric power amount to be supplied to the electric load given the "priority 1" from the available electric power Pelclmt is distributed to the moving electric motor 23 and the turning electric motor 21.

Figure 6:
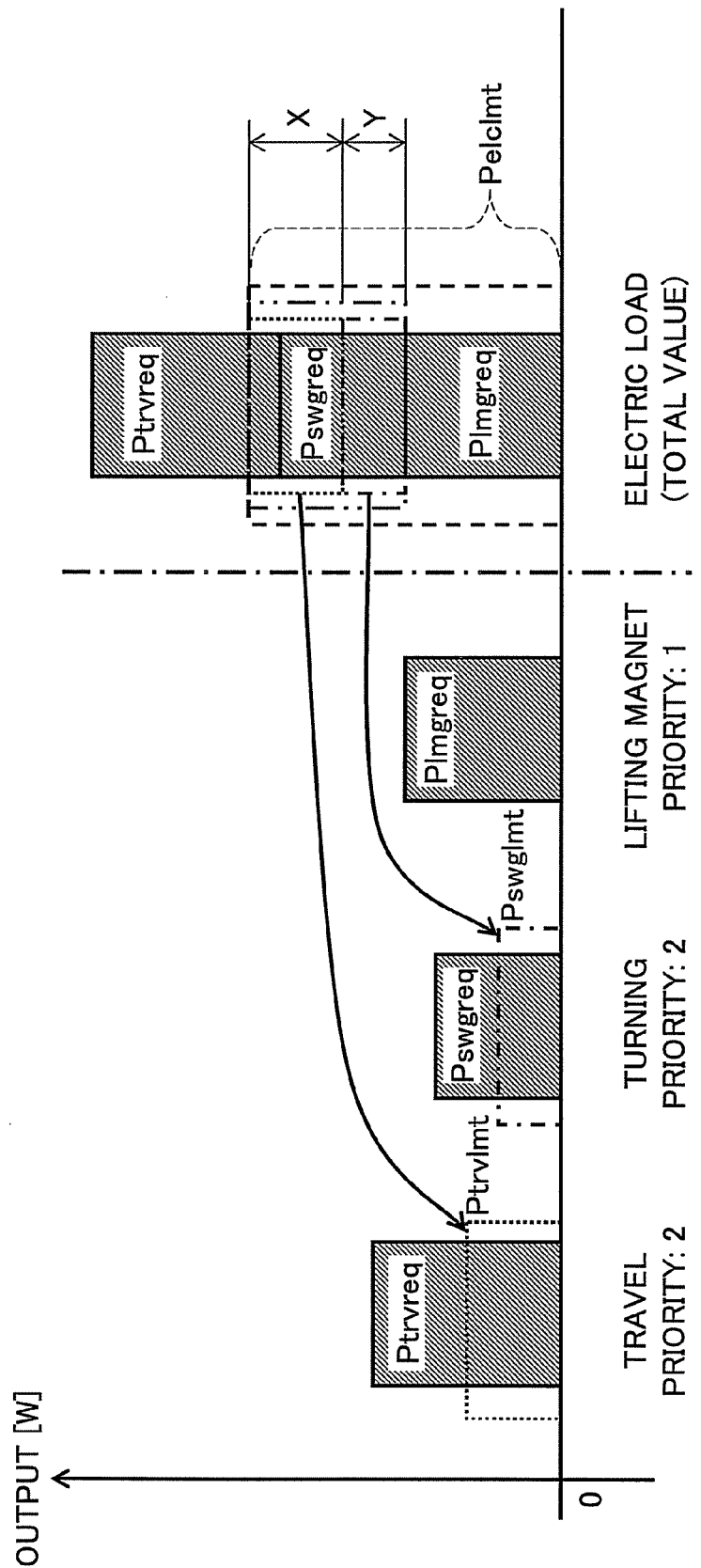
FIG. 6 is an illustration for explaining a step S8 in the flowchart of FIG. 4.

FIG. 6 is an illustration for explaining the above-mentioned step S8. In FIG. 6, the request electric power amount of the moving electric motor 23, the request electric power amount of the turning electric motor 21 and the request electric power of the lifting magnet 25 are indicated by bar graphs. Furthermore, the total request electric power amount Pelcreq computed by the electric load request output computing function 54 is indicated by a bar graph. The total request electric power amount Pelcreq is an electric power amount obtained by summing the request electric power amount Ptrvreq of the moving electric motor 23, the request electric power amount Pswgreq of the turning electric motor 21 and the request electric power amount Plmgreq of the lifting magnet 25. Performing the power distributing process in step S8 means that the limit electric power value Pelclmt supplied by the output condition computing and power distributing function 60 is equal to or smaller than the total request electric power amount Pelcreq. In FIG. 6, the limit electric power value Pelclmt is indicated by dotted lines in the bar graph representing the total request electric power amount Pelcreq. Additionally, a remaining electric power amount obtained by subtracting the electric power amount to be supplied to the electric load given the "priority 1" from the available electric power Pelclmt is indicated by double-dashed chain lines.

In the distributing process of step S8, the remaining electric power amount (a portion indicated by double-dashed chain lines) obtained by subtracting the electric power amount to be supplied to the electric load given the "priority 1" from the available electric power amount Pelclmt is distributed in proportion to the degrees of the request electric power amounts of the moving electric motor 23 and the turning electric motor 21. In FIG. 6, the electric power amount Ptrvlmt distributed to the moving electric motor 23 is indicated by dotted lines, and the electric power amount Pswglmt distributed to the turning electric motor 21 is indicated by single-dashed chain lines. It can be appreciated from FIG. 6 that because there is no room in the available electric power, the electric power amount Ptrvlmt actually supplied to the moving electric motor 23 is limited to a value smaller than the request electric power amount Ptrvreq, and the electric power amount Pswglmt actually supplied to the turning electric motor 21 is limited to a value smaller than the request electric power amount Pswgreq.

That is, the remaining electric power amount obtained by subtracting the electric power amount to be supplied to the electric load given the "priority 1" from the available electric power Pelclmt is divided according to a ratio (X:Y) of the request electric power amount Ptrvreq of the moving electric motor 23 to the request electric power amount Pswgreq of the turning electric motor 21 so that the electric power amount Ptrvlmt corresponding to the proportion X of the request electric power amount Ptrvreq of the moving electric motor 23 is distributed to the moving electric motor 23 and the electric power amount Pswglmt corresponding to the proportion Y of the request electric power amount Pswgreq of the turning electric motor 21 is distributed to the turning electric motor 21.

After the process of step S8 is completed, the process of steps S5 through S8 is repeated until no electric load to be selected remains.

Figure 7:
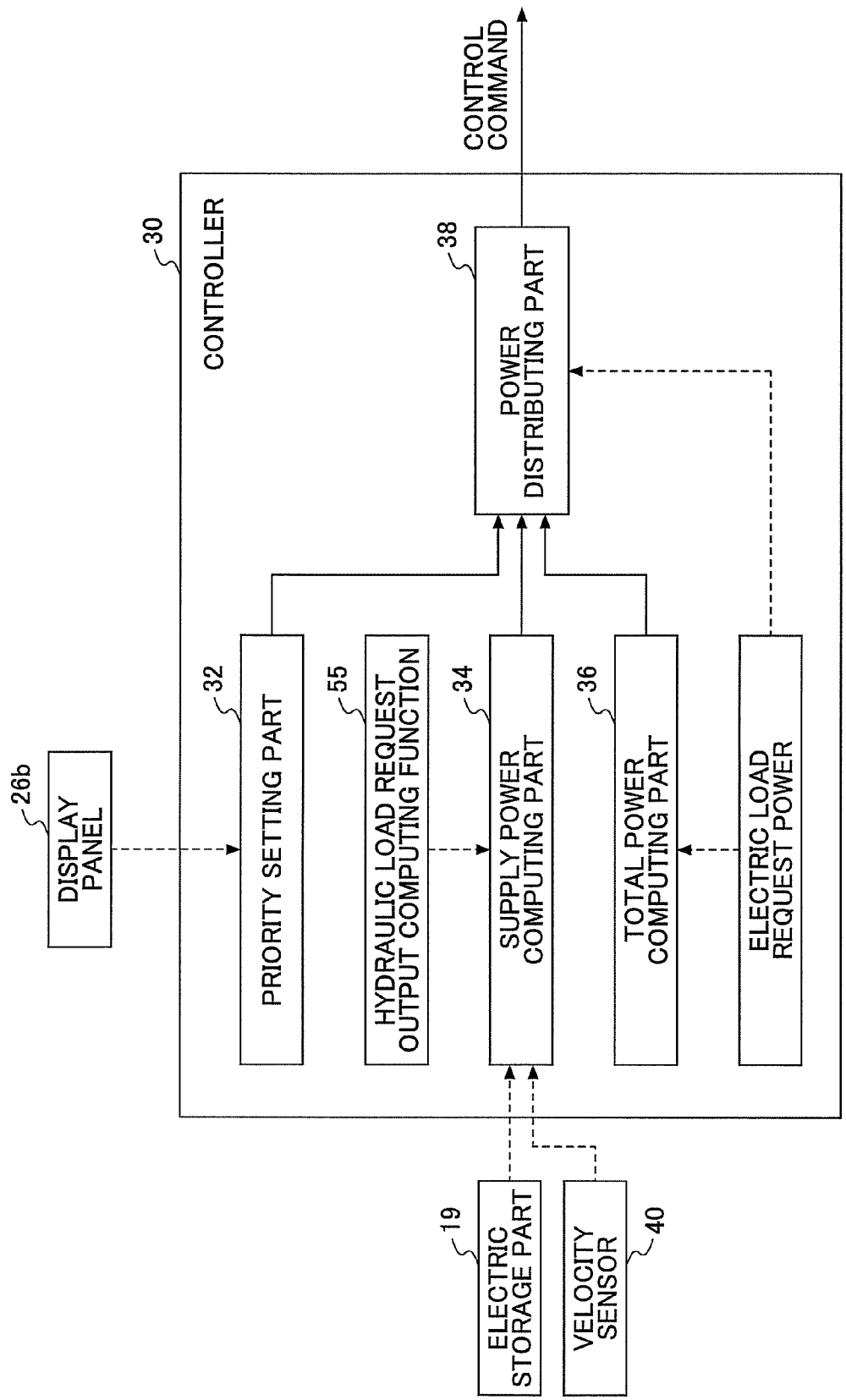
FIG. 7 is a functional block diagram illustrating an electric distribution limiting function of a controller.

FIG. 7 is a function block diagram illustrating the electric power distribution limiting function in the controller 30. In FIG. 7, only portions which carry out the electric power distribution limiting function from among all functions of the controller 3 are illustrated by function blocks.

A priority setting part 32 of the controller 30 sets a priority to each electric load based on information input through the display panel 26b. The priority may be determined previously and stored as priority information in the controller 30. The priority setting part 32 corresponds to a dotted line arrow extending from the operation panel 26b toward the electric load output limiting function 57.

A supply electric power computing part 34 of the controller 30 computes an electric power amount, which can be supplied from the motor generator 12 and the electric storage part 19, based on the output state of the motor generator 12 and the output state of the electric storage part 19. The thus-computed electric power is a currently available electric power. The output state of the motor generator 12 can be acquired based on the hydraulic load request output and the output of the engine 11. The output state of the motor generator 12 can be acquired by the output condition computing and power distributing function 60 based on the speed detection value output from the speed sensor 40 of the engine 11 and the hydraulic load request output from the hydraulic load request output computing function 55. The output state of the electric storage part 19 can be acquired by the output condition computing and power distributing function 60 based on the voltage detection value output from the voltage sensor 112 of the electric storage part 19. Thus, the supply electric power computing part 34 corresponds to a part of the output condition computing and power distributing function 60 in the controller 30 illustrated in FIG. 2.

A total power computing part 36 of the controller 30 is a part which sums the request outputs of the electric loads. The total power computing part 36 corresponds to the electric power load request output computing function 54 of the controller 30. That is, the total power computing part 36 acquires the total request electric power value Pelcreq as a total electric power value, which is a sum of the request electric power amounts supplied from the speed control function 51 of the turning electric motor 21, the speed control function 52 of the moving electric motor 23 and the voltage control function 53 of the lifting magnet 25.

A power distribution part 38 of the controller 30 compares the available electric power value supplied from the supply power computing part 34 with the total electric power value supplied from the total power computing part 36, and determines whether the total electric power value is larger than the available electric power value. This determination corresponds to a part of the output condition computing and power distributing function 60 of the controller 30. Then, if the total electric power value is larger than the available electric power value, the power distributing part 38 determines a distribution ratio of the electric powers to be supplied to the electric loads based on the priority supplied from the priority setting part 32, and outputs a limit command for limiting the electric power supplied to each electric load. This function corresponds to the electric load output limiting function 57 of the controller 3 illustrated in FIG. 2.

As mentioned above, according to the present embodiment, when a total of electric power amounts requested by a plurality of electric loads is larger than a currently available electric power, the limited available electric power can be appropriately distributed to the electric loads by setting a priority to each electric load in consideration of a characteristic of each electric load and an operating condition of the machine.

Although the "priority 1" is set to the lifting magnet 25 in the above-mentioned embodiment, the highest priority is not always given to the lifting magnet 25. The priority may be appropriately set according to an operating condition and an intention of an operator. However, it is preferable to prevent the operator from easily changing the priority.

Although the parallel system hybrid-type working machine has been explained in the above-mentioned embodiment, the present invention is applicable to a hybrid-type working machine of a series full-motorized system.

Figure 8:
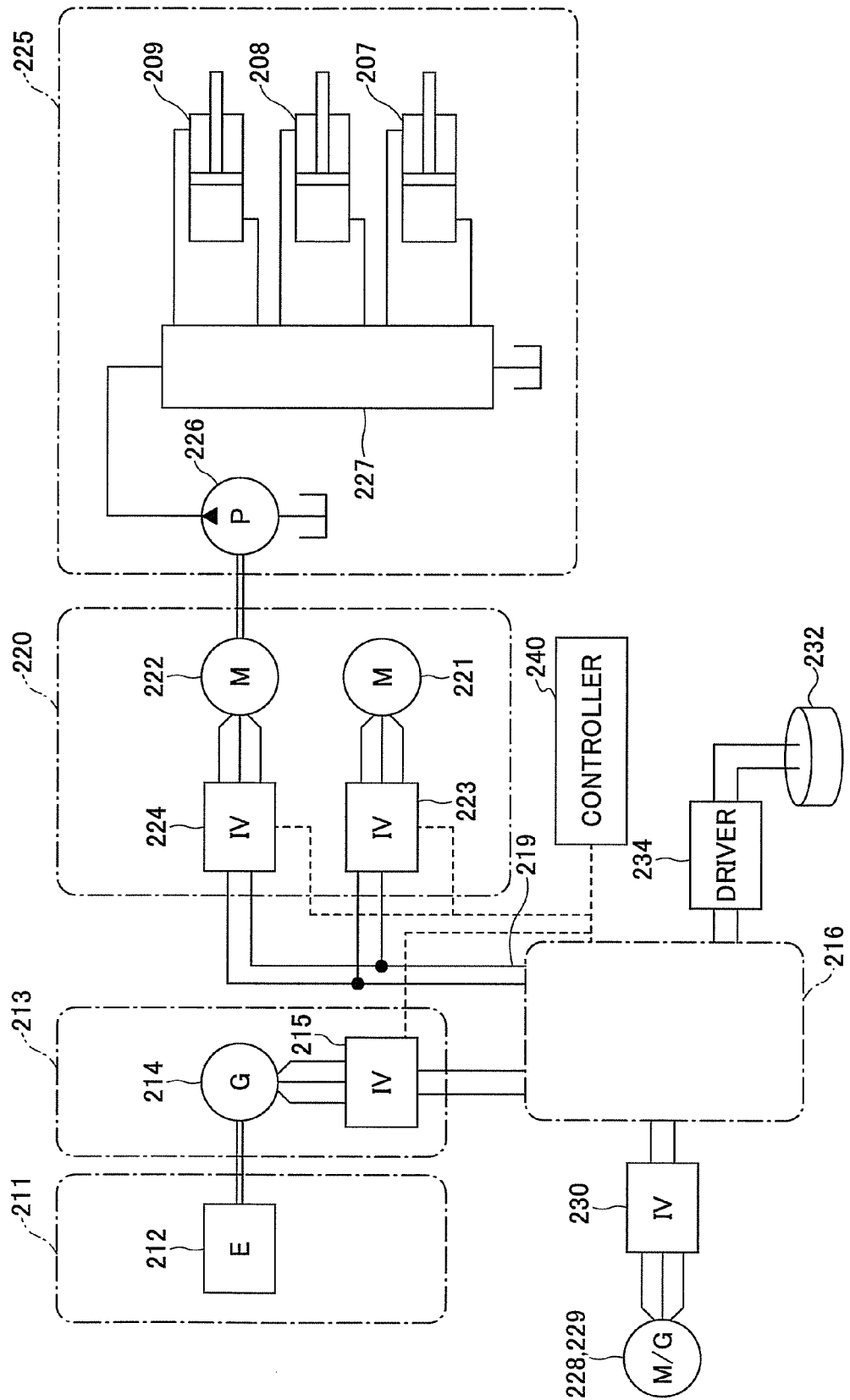
FIG. 8 is a block diagram illustrating a structure of a series-system full-motorized hybrid hydraulic shovel, which is a hybrid-type working machine of a series system to which the present invention is applicable.

FIG. 8 is a block diagram illustrating a structure of a hybrid-type hydraulic shovel of a series full-motorized system, which is an example of a hybrid-type working machine of a series system to which the present invention is applicable. In FIG. 8, a mechanical power system is indicated by double lines, hydraulic lines by bold lines, an electric drive system by thin lines, and an electric control system by dashed lines.

An engine 212 of a mechanical drive part 211 drives an electric generator 214 of an electric power generating part 213. The electric power generated by the electric generator 214 is supplied to an electric storage part 216 via an inverter 215 of the electric power generating part 213. The electric power supplied to the electric storage part 216 is supplied by a converter 217 to a battery (not illustrated in the figure) as an electric storage part.

An electric load system 220, which is driven by receiving an electric power supply from the battery, is provided with a turning electric motor 221 and a pump-driving electric motor 22. The turning electric motor 221 is a motor for turning an upper-part turning body.

Electric power is supplied to the turning electric motor 221 from the battery through an inverter 223.

Electric power is also supplied to the pump-driving electric motor 222 from the battery through an inverter 224. The pump-driving electric motor 222 is a motor for driving a hydraulic pump 226 of a hydraulic load system 225.

Hydraulic pressure generated by the hydraulic pump 226 is supplied to each of a bucket cylinder 209, an arm cylinder 208 and a boom cylinder 207. The bucket cylinder 209 is a hydraulic cylinder for driving a bucket. The arm cylinder 208 is a hydraulic cylinder for driving an arm. The boom cylinder 207 is a hydraulic cylinder for driving a boom.

A run (right) hydraulic motor 228 is an electric motor, which is for driving a right crawler of a lower-part moving body and which can generate electric power, and a run (left) motor 229 is an electric motor, which is for driving a left crawler of the lower-part moving body and which can generate electric power. The run (right) motor 228 and the run (left) motor 229 are controlled by a drive inverter 230. Additionally, a lifting magnet 232 is controlled by a driver 234.

Although a capacitor such as an electric double layer capacitor is used as the battery, the battery is not limited to such a capacitor and other rechargeable electric storage devices may be used. The capacitor has an advantage in that a state of charge (SOC) can be easily acquired from a terminal voltage. It should be noted that a voltage detector (not illustrated in the figure) is connected to the terminals of the battery to detect the terminal voltage of the battery.

A controller 240 controls an inverter 215, 223 and 224 and a converter (not illustrated in the figure) to control electric power supplied from the electric generator 214 to the battery and electric power supplied from the battery to the electric load system 220. Additionally, the controller 240 acquires a state of charge (SOC) of the battery based on a detection voltage output from a voltage detector 230 to control an output (charge/discharge amount) of the battery based on the acquired state of charge (SOC).

In the above-mentioned hybrid-type hydraulic shovel of a series full-motorized system, a current senor is provided between the electric generator 214 and the inverter 215, and a voltage sensor for detecting a voltage of a DC bus 219 is provided. Similar to the above-mentioned hybrid-type shovel of a parallel system, an electric current is supplied to the DC bus 219 by controlling the electric generator 214 by switching the voltage control of the DC bus 219 in the controller 240 in order to drive the electric loads. It should be noted that the hydraulic loads are also driven by electric current generated by an electric power generating operation of the electric generator 214 because the hydraulic pump 226 is driven by the pump-driving electric motor 222 in the hybrid-type hydraulic shovel of a series full-motorized system.

The present invention is not limited to the specifically disclosed embodiments, and variations and modifications may be made without departing from the scope of the present invention.

The present application is based on Japanese priority application No. 2009-102322 filed on Apr. 20, 2009, the enter contents of which are hereby incorporated herein by reference.

What is claimed is:

1. A hybrid-type working machine comprising:
an engine that drives a hydraulic pump;
a motor generator that assists the engine;
a plurality of electric loads;
an electric storage part that supplies electric power to the motor generator and the electric loads; and
a control part that controls said engine, said motor generator, said electric loads and said electric storage part,
wherein the control part includes a CPU to perform functions of:
setting a priority to each of said electric loads;
computing an available electric power, which can be supplied from said motor generator and said electric storage part to said electric loads;
computing a total electric power amount by summing electric power amounts requested by said electric loads; and
comparing said available electric power with said total electric power amount, and, when said available electric power is smaller than said total electric power amount, determining a distribution ratio of electric power amounts to be supplied to the respective electric loads based on said priority to limit the electric power amounts supplied to said electric loads,
wherein said determining determines the distribution ratio so that no limitation is applied to the electric power amount to be supplied to one of said electric loads, of which one is given said priority indicating a highest priority, and
wherein, when the electric power amount requested by said one of said electric loads given the highest priority is larger than the available electric power, said determining determines the distribution ratio so that the entire available electric power is supplied to said one of said electric loads given the highest priority.

2. The hybrid-type working machine as claimed in claim 1, wherein, when there are a plurality of electric loads given the same priority from among said electric loads, said determining determines the distribution ratio so that the electric power amount to be supplied to said plurality of electric loads given the same priority is divided according to a ratio of electric power amounts requested by each of said plurality of electric loads given the same priority.

3. The hybrid-type working machine as claimed in claim 1, wherein, when said plurality of electric loads includes a lifting magnet, said setting a priority sets a highest priority to the lifting magnet.

4. The hybrid-type working machine as claimed in claim 1, wherein, when there are a plurality of electric loads given the same priority from among said electric loads, said determining determines the distribution ratio so that the electric power amount to be supplied to said plurality of electric loads given the same priority is divided according to a ratio of electric power amounts requested by each of said plurality of electric loads given the same priority.

5. The hybrid-type working machine as claimed in claim 1, wherein, when said plurality of electric loads includes a lifting magnet, said setting a priority sets a highest priority to the lifting magnet.

* * * * *